June 17, 1958 F. A. HESTER 2,839,646

PHOTOCELL STRUCTURE

Filed Nov. 14, 1955

*INVENTOR.*

FRANK A. HESTER

*BY* J. B. Burke

ATTORNEY

United States Patent Office 2,839,646

Patented June 17, 1958

2,839,646

PHOTOCELL STRUCTURE

Frank A. Hester, New York, N. Y., assignor to Clairex Corporation, New York, N. Y., a corporation of New York Application November 14, 1955, Serial No. 546,494

3 Claims. (Cl. 201—63)

This invention relates to the art of photosensitive or photoconductive cells and particularly concerns a novel structural assembly for a rugged, moisture-proof sealed photocell containing a semi-conductive crystal.

Crystals of cadmium sulphide, zinc sulphide, cadmium selenide, cadmium telluride and others respond to the incidence of light rays, X-rays, infra-red rays, corpuscular rays, and other radiant energy rays by increasing their electrical conductivity as a function of the incident rays. This physical property is broadly characterized herein as photoconductivity. In order that this physical property may be properly utilized it is necessary to attach suitable electrodes to a crystal for application of an electrical potential to conduct current through the crystal. It is also necessary to provide a suitable holder for the crystal and electrode assembly. The photoconductive crystal employed in a photocell has a body of the order of a few millimeters in length and width and less than one millimeter in thickness. This relatively minute and fragile body is adversely affected by exposure to contaminating influences such as moisture, dust and chemical fumes and to disturbing influences such as mechanical strains, high temperature, and so on. The sensitivity of a photoconductive crystal is reduced or destroyed by these adverse influences and necessitates some effective means to protect the crystal from them. The mounting of the crystal must insulate it from thermal shocks caused when the electrodes which contact the crystal are soldered into an electrical circuit. The mounting must also be substantially transparent to the incident rays directed to the crystal. Complete sealing of the crystal is thus necessary.

It has been discovered, as disclosed in my copending application Ser. No. 436,480, filed June 14, 1954, of which this application is a continuation-in-part, that the crystal can be embedded in a solid transparent plastic casing with a viscous buffer between the crystal and the casing to distribute uniformly any mechanical stresses which might be applied to the crystal. According to the present invention a structure is provided which shields the crystal from all mechanical stresses which might be applied to it. The most important mechanical stress guarded against is that one caused when the plastic material in which the crystal is embedded solidifies from a liquid state during the embedment process. Photocells constructed according to the present invention have substantially improved stability and sensitivity over that of prior photocell structures.

It is therefore a principal object of the invention to provide a transparent sealed holder for a semi-conductor crystal wherein the crystal is shielded against mechanical stresses and rapid ambient temperature changes.

It is a further object to provide a small, simple, moisture-proof, rugged inexpensive photocell including a photosensitive semi-conductive crystal of cadmium sulphide or the like, and lead wires suitable for wiring into an electrical circuit.

It is a further object to provide a transparent cap for a photoconductive crystal mounted on a light reflecting platform.

It is a further object to provide a photo-conductive crystal with a substantially rectangular platform whereby a plurality of such platforms may be readily juxtaposed to form an assembly or matrix of photocells.

It is a further object to provide a photocell structure having a maximum diameter or thickness of .06 inch.

Other and further objects and advantages of the invention will become apparent from the following detailed description taken together with the drawing, wherein.

In Figs. 1, 2, 3, 4 are shown a flat cylindrical disc or pill 12. On the disc is mounted a crystal 14 of cadmium sulphide or the like. The disc is made of a material such as unglazed porcelain or other ceramic having a temperature coefficient of expansion substantially the same as that of the crystal. The body of the disc and particularly the top surface S facing the crystal should have a maximum ray reflecting characteristic so that rays incident on the crystal and passing therethrough will be reflected back to the crystal. For use with ordinary light rays the surface S should be smooth and white.

Figure 1:
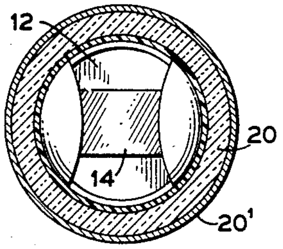
Fig. 1 is an elevational sectional view of a photocell embodying the invention.
Figure 4:
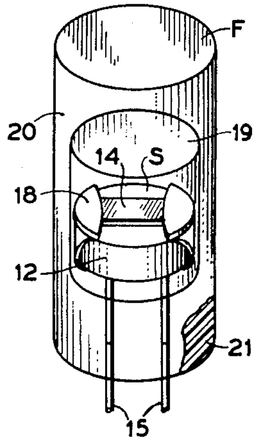
Fig. 4 is an exterior elevational view of the photocell.
Figure 3:
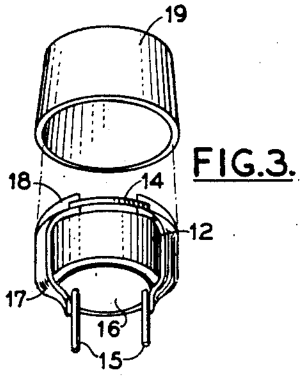
Fig. 3 is a perspective view showing a crystal mounting platform and cap therefor.

Attached to the underside of the disc 12 are a pair of wire pins 15. The pins are secured by a suitable non-conductive adhesive 16 to the disc. The adhesive layer surrounds the heads of the pins as shown in Figs. 1, 3. A strip of electrically conductive material 17 having a poor heat conductivity characteristic extends from each pin 16 up along the side of the disc to the top surface S. Crystal 14 lies on the terminal ends of these strips. The strips 17 serve as electrodes connecting lead wire 15 with the opposite ends of crystal 14. The strips 17 may be applied as stripes of a conductive paint or paste before the crystal is mounted thereon. In order to secure the crystal to the electrodes 17, solder layers 18 are applied over each end of the crystal. The solder has a low melting temperature so that in application thereof the crystal is not subjected to a heat shock. Over the disc 12 which serves as a platform for the crystal is mounted a transparent cap or shield 19 of plastic, glass, or other suitable insulating material. This cap is rather conical in shape and when pressed down over the disc 12 defines a chamber with the disc in which is enclosed the crystal 14. Only air or some other gaseous medium chemically inactive with respect to the crystal, fills the space V between the crystal and the transparent wall of the chamber. The capped crystal and platform assembly is embedded in a transparent plastic casing 20. The casing may be a cylindrical body coated with an opaque layer 20' on all sides except the top face F which is left clear and transparent to incident rays. In the usual method of manufacture case 20 is formed by immersing the capped crystal-platform assembly in a liquid plastic which is allowed to harden with or without the application of heat. Regardless of whether the liquid plastic is thermosetting or thermoplastic in solidifying it generally contracts around the capped crystal-platform assembly. The shield 19 serves to take up all mechanical contraction stresses which might otherwise be applied to the crystal. Since the crystal is elevated off of surface S by the thickness of electrode lands L, both surfaces of the crystal exposed to direct incident rays and rays reflected from surface S of the platform are suspended in the chamber V. Thus even during subsequent use, any mechanical shocks which may be imparted to the case, do not reach the crystal, which insures continued stability and long active life to the photocell.

Figure 5:
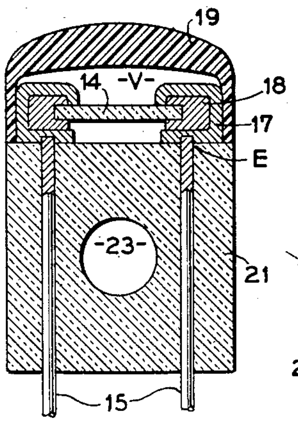
Fig. 5 is an elevational sectional view of a photocell showing a modification of the invention.
Figure 6:
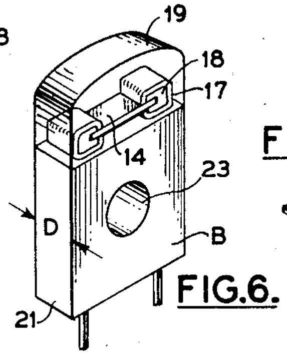
Fig. 6 is an external isometric view of the photocell of Fig. 5.
Figure 7:
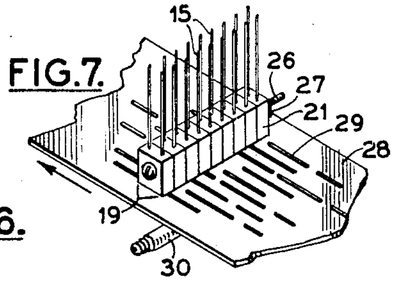
Fig. 7 is an isometric view of an assembly of photocells arranged for scanning a moving tape.
Figure 8:
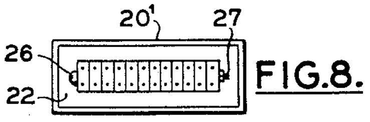

In Figs. 5 and 6 are shown a photocell structure adapted for disposition in a stacked assembly as illustrated in Fig. 7. In this structure the platform 21 is a flat rectangular ceramic plate or prism 21 having a thickness D of about .06 inch. Wire leads 15 extend through the plate from end to end. Crystal 14 has its ends covered with solder 18. This may be accomplished by dipping each end of the crystal in liquid solder before mounting it on the platform. The soldered ends of the crystal are surrounded by electrically conductive electrode layers 17 having poor heat conductivity which contact the ends E of the pins 15. To the form layers 17, the pin ends E may first be coated with electrically conductive paint. The soldered crystal is placed on the paint coating and then the painting of layer 17 is completed over solder 18. This arrangement insures a good electrically conductive path between the wire leads 15 and the ends of the crystal, while electrode layers 17 insulate the crystal from heat shock as above mentioned. A transparent plastic cap or shield 19 in which may be a cavity is cemented over the crystal to the top of plate 21. An aperture 23 is centrally disposed in plate 21 and provides a convenient means for securing a plurality of photocells together. As shown in Fig. 7 a screw 26 and nut 27 passes through registering apertures 23 to secure a plurality of photocells in juxtaposed positions. A transparent casing 22 of plastic with a lateral opaque coating 20′ may wholly enclose the entire assembly so juxtaposed as shown in Fig. 8. In Fig. 7 the assembly is shown used for scanning an opaque moving tape 28 having slits 29 therein. Lamp 30 disposed below the tape provides light rays which pass through the slits to impinge on the crystals in the photocells. Wire leads 15 protruding from the bottom of plates 21 are connected in suitable electrical circuits. The casing 22 is omitted in Fig. 7 to show the stacked assembly more clearly.

Figure 10:
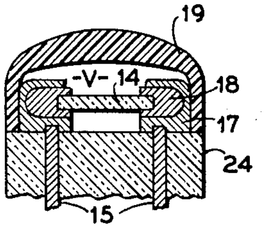
Fig. 10 is a fragmentary elevational sectional view taken on lines 10—10 of Fig. 8.
Figure 9:
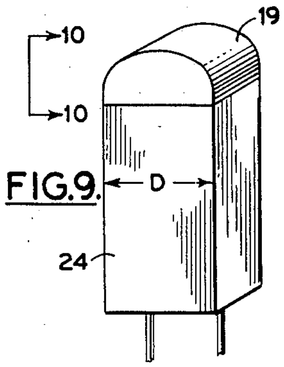
Fig. 9 is a perspective view of a photocell showing a further modification of the invention.
Figure 2:
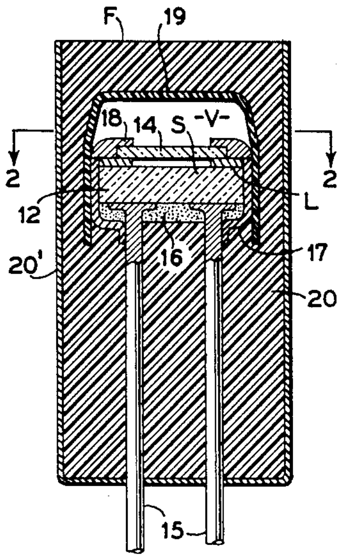
Fig. 2 is a cross-sectional view taken on lines 2—2 of Fig. 1.
Figure 11:
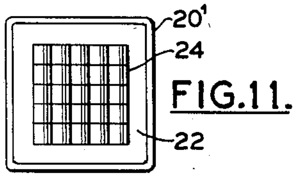
Figs. 8, 11 are plan views of assemblies of photocells in a single casing.

In Figs. 9, 10 are shown another form of photocell in which the platform 24 is an equilateral prism and has a thickness D of about .06 inch. The structure is similar to that of the flat structure of Figs. 5–7 but the photocells are adapted for assembly into a square or rectangular matrix as shown in Fig. 11. In Fig. 11 the transparent plastic casing 22 wholly encloses a plurality of prismatic crystal-platform assemblies 24. An opaque coating 20′ is painted on the sides of the assembly. In a matrix having a one inch cross section two hundred or more prismatic crystal-platform assemblies may be so disposed. The top of each cap 19 may have such a curvature that it serves as a lens to focus light rays on the crystal 14. The platforms 24 may also be shaped as elongated round cylinders if so desired.

What is claimed is:

1. A cell having electrical conductivity responsive to the intensity of rays incident thereon, comprising a transparent cylindrical body, an opaque coating covering the body with one end of the body being uncoated to leave a window therein transparent to said rays, a rigid flat opaque cylindrical platform embedded in the body, said platform having a flat ray reflective end surface disposed parallel to said one end of the body, a pair of electrodes painted on opposite sides of the platform, a crystal element disposed on the body and spaced from said reflective surface thereof, solder means securing the crystal element to the platform, a cap transparent to said rays embedded in said body over said platform and spaced from said crystal element, said cap enclosing the crystal element in a gas-tight chamber in said body, a pair of electrically conductive wires extending through said body and terminating at the opposite flat end of the platform, said wires being electrically connected to said electrodes, said electrodes having a heat conductivity characteristic substantially less than that of said conductive members, and a gaseous medium chemically inert with respect to the crystal element filling said chamber, so that the crystal element is insulated by said cap and said electrodes from thermal and mechanical shocks applied to the body.

2. A cell having electrical conductivity responsive to the intensity of incident rays, comprising a solid body having a portion transparent to said rays to define a window, a photosensitive crystal element supported in said body and disposed to receive said rays, a rigid platform embedded in said body and having a ray reflective surface, a pair of heat resistant electrodes disposed on said surface and supporting said crystal element a fixed distance from said surface, a hollow cap transparent to said rays embedded in said body over said platform between said window and said surface and enclosing the crystal element in a gas-tight chamber, said cap being spaced from said crystal element, and electrically conductive members connected to said electrodes, said electrodes having a heat conductivity characteristic substantially less than that of said conductive members, whereby the crystal element is insulated in the body by said cap and electrodes from thermal and mechanical shocks.

3. A cell having electrical conductivity responsive to the intensity of incident rays, comprising a solid plastic body having a portion transparent to said rays to define a window, a photosensitive crystal element supported in said body and disposed to receive said rays, a rigid platform embedded in said body and having a ray reflective surface, a pair of electrodes mounted on said platform and supporting said crystal element a fixed distance from said surface, a hollow cap transparent to said rays embedded in said body and spaced from said crystal element, said cap being disposed over said platform and enclosing the crystal element, and a pair of electrically conductive members connected respectively to said electrodes, whereby the crystal element is insulated by said cap in the body from thermal and mechanical shocks.

References Cited in the file of this patent

UNITED STATES PATENTS

| | | |
|---|---|---|
| 2,001,672 | Carpenter | May 14, 1935 |
| 2,041,816 | Carpenter | May 26, 1936 |
| 2,217,326 | Wald | Oct. 8, 1940 |
| 2,668,867 | Ekstein | Feb. 9, 1954 |
| 2,740,875 | Inman | Apr. 3, 1956 |
| 2,742,550 | Jenness | Apr. 17, 1956 |